Feb. 8, 1955　　　A. LUKSCH ET AL　　　2,701,377
ROTARY BRUSH POWER SWEEPER
Filed Jan. 17, 1949　　　　　　　　　　　　　7 Sheets-Sheet 1

INVENTORS
ANDREAS LUKSCH
RALPH C. PEABODY
BY Paul, Paul & Moore
ATTORNEYS

Feb. 8, 1955 A. LUKSCH ET AL 2,701,377
ROTARY BRUSH POWER SWEEPER
Filed Jan. 17, 1949 7 Sheets-Sheet 2
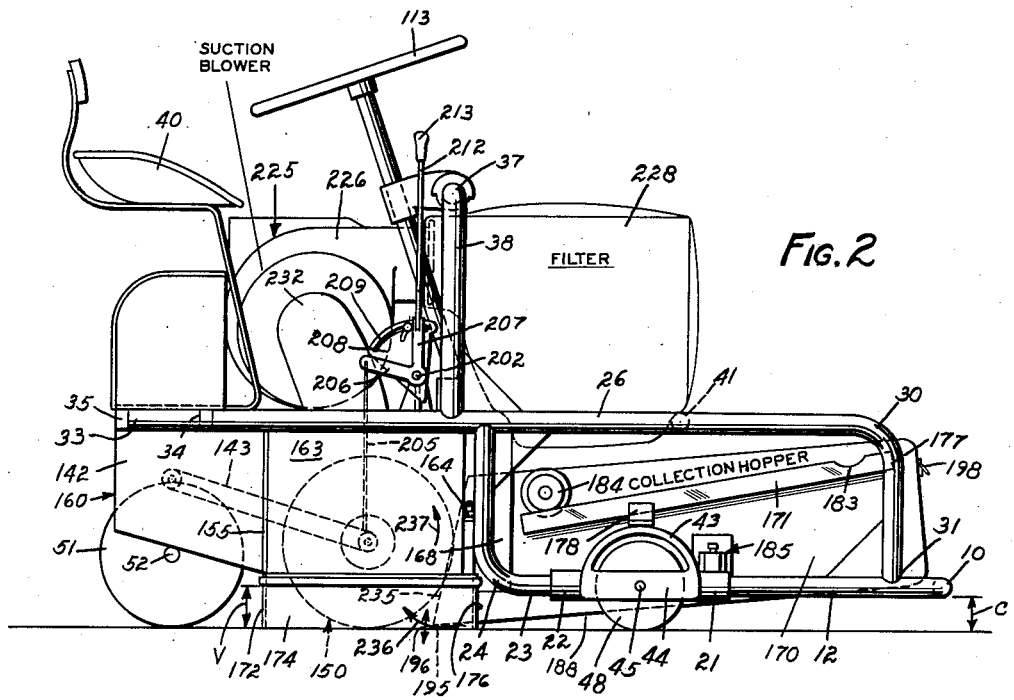
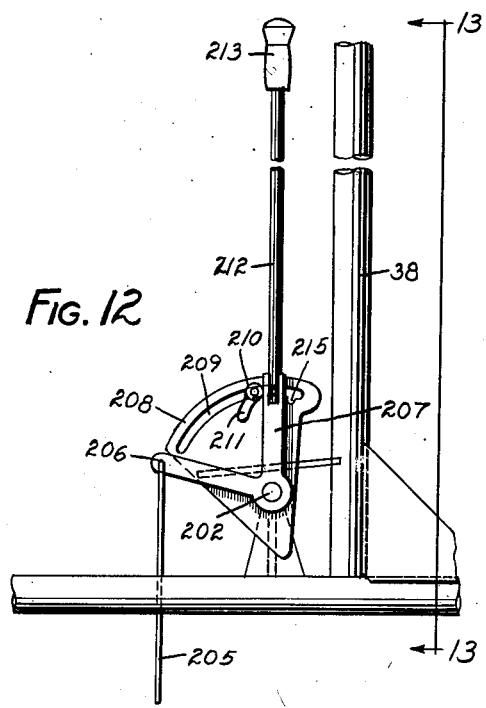
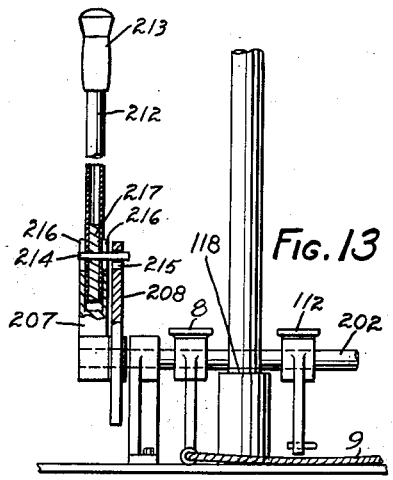
INVENTORS
ANDREAS LUKSCH
RALPH C. PEABODY
BY Paul, Paul & Moore
ATTORNEYS

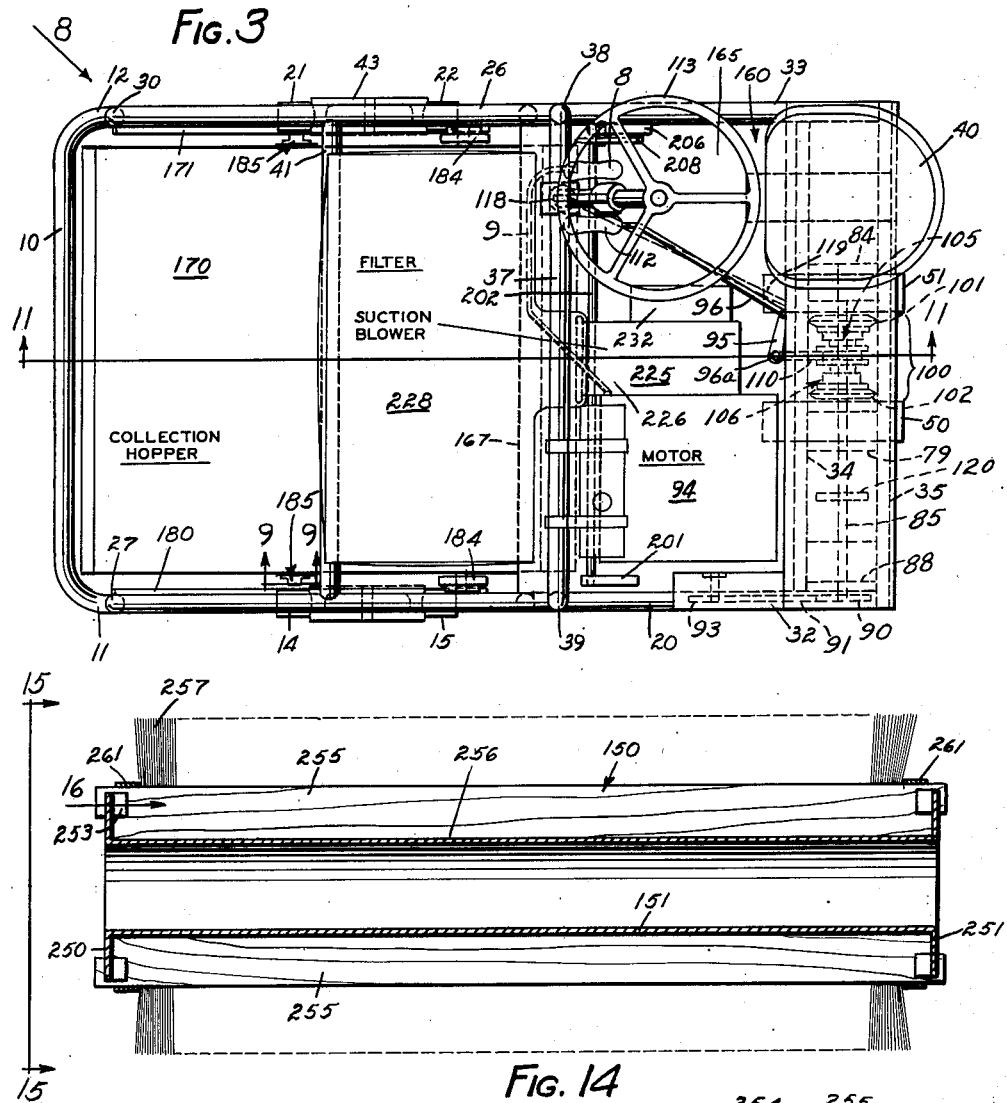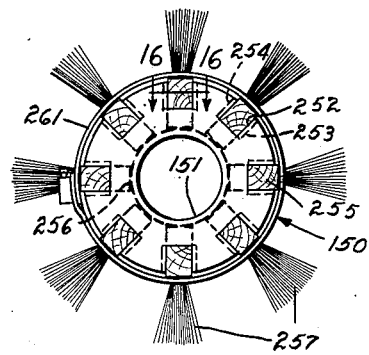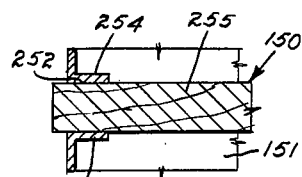

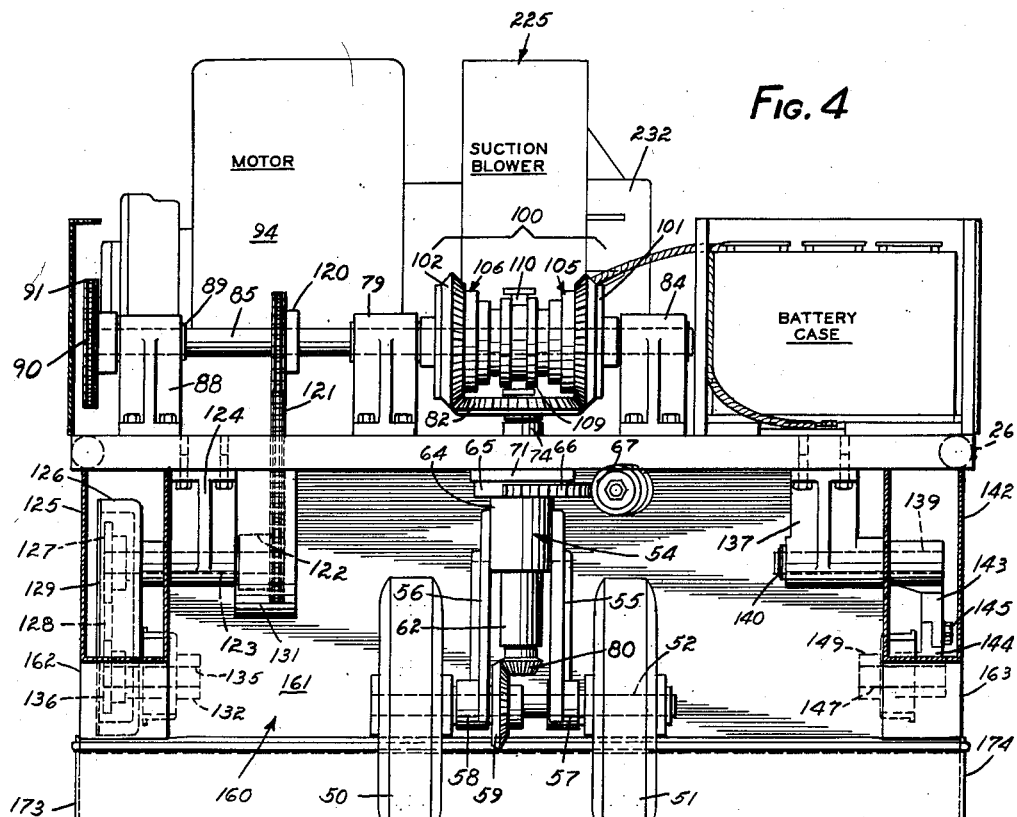

INVENTORS
ANDREAS LUKSCH
RALPH C. PEABODY
BY Paul, Paul & Moore
ATTORNEYS

INVENTORS
ANDREAS LUKSCH
RALPH C. PEABODY
BY Paul, Paul & Moore
ATTORNEYS

Feb. 8, 1955     A. LUKSCH ET AL     2,701,377
ROTARY BRUSH POWER SWEEPER
Filed Jan. 17, 1949     7 Sheets-Sheet 7

INVENTORS
ANDREAS LUKSCH
RALPH C. PEABODY
BY Paul, Paul & Moore
ATTORNEYS

United States Patent Office 2,701,377
Patented Feb. 8, 1955

2,701,377

ROTARY BRUSH POWER SWEEPER

Andreas Luksch and Ralph C. Peabody, Minneapolis, Minn., assignors to G. H. Tennant Company, Minneapolis, Minn., a corporation of Minnesota Application January 17, 1949, Serial No. 71,312

9 Claims. (Cl. 15—49)

This invention relates to sweeping mechanisms and more particularly to large size, power-driven industrial sweeping machines capable of sweeping large floor areas in factories, docks and public places. The proper sweeping of large areas, such as factories, warehouses, docks, auditoriums, plazas and the like, as well as ramps, exterior walks, platforms and roadways in and around factory buildings, airports, docks and the like has presented many problems that do not arise in the sweeping of relatively small areas. The vast amount of space which must necessarily be covered frequently has required either a large crew of janitors or has required sweeping machinery. The use of a large amount of labor, with simple brooms is disadvantageous, not only from the labor cost but because of the inadequate sweeping results produced by the small push broom, and due to the dust raised thereby. In many places, such as factories, warehouses and the like, and also auditoriums and plazas, it is necessary to carry on cleaning operations while business is being conducted or while personnel or the public are in the places being swept, and this has made it desirable to carry out the sweeping operations quickly, noiselessly and as expeditiously as possible, and at the same time in such a way as to raise a minimum amount of dust and commotion due to the sweeping operation. None of the hand sweeping methods or power machines previously available for accomplishing such purposes have been entirely satisfactory. The hand methods of sweeping, previously mentioned, are disadvantageous because of the high labor cost, slowness of the operation, and the large amount of dust raised and the commotion caused by the sweeping operation, as conducted by a large number of men working simultaneously. Power sweeping equipment has been disadvantageous because of the cumbersome character of the machines heretofore available and due to the fact that machines raised a large amount of dust, could not be maneuvered adequately into and out of relatively confined areas within the space being swept, because they were inadequate to carry out the sweeping operation over irregularities in the floor being swept and because of many other factors of construction and operation of such machines which has mitigated against their successful use.

It is an object of the present invention to provide an improved power sweeping machine capable of being made in a variety of sizes and capable of sweeping very large areas, such as areas as much as one acre per hour of machine operation.

It is a further object of the invention to provide an improved sweeping machine of light weight character and very maneuverable and capable of forward or reverse operation into and out of confined areas within the space being swept.

It is a further object of the invention to provide an improved power sweeping machine wherein the sweeping can be carried out over floors of considerable irregularity and yet with great efficiency of sweeping results.

It is a further object of the invention to provide an improved power sweeping mechanism having large capacity for the swept material and having a container or pan for the swept material capable of being easily adjusted up and down so as to work close to the floor over which the machine is run and yet so constructed that the pan will automatically clear obstacles.

It is a further object of the invention to provide an improved power sweeping machine having a dust-collecting pan capable of rising automatically over obstacles and balanced so as to permit easy handling by the machine operator for pan-dumping operation.

Another object of the invention includes the provision of a power-driven industrial sweeper capable of easy use by inexperienced operators and which is rugged and dependable and built for hard service and heavy duty in factories, warehouses, mills, stores, railroad platforms and wherever fast sweeping over large areas is required.

Other and further objects of the invention include those inherent in the apparatus herein illustrated, described and claimed.

The invention is illustrated with reference to the drawings in which corresponding numerals refer to the same parts and in which Figure 1 is a left side elevational view of the apparatus of the invention;

Figure 2 is a right side elevational view of the apparatus of the invention;

Figure 3 is a plan view of the apparatus of the invention;

Figure 4 is a rear elevational view of the machine on a somewhat enlarged scale with certain parts removed, and other parts shown in section;

Figure 7 corresponding to Figure 1;

Figure 8 is a fragmentary quarter-front isometric elevational view taken in the direction of arrow 8 of Figure 3, illustrating a portion of the collecting hopper of the machine and its mounting;

Figure 9 is an enlarged fragmentary side elevational view, partly in section, taken along the line and in the direction of arrows 9—9 of Figure 3, showing one of the mounting supports for the material collecting hopper of the device;

Figure 10 is a fragmentary sectional view corresponding to the parts shown in Figure 9 and taken along the line and in the direction of arrows 10—10 of Figure 9;

Figure 12 is a detail side elevational view of the brush height regulating lever mechanism of the machine shown on a somewhat enlarged scale;

Figure 13 is a fragmentary front elevational view of the brush height regulating mechanism from the direction of arrows 13—13 of Figure 12;

Figure 14 is a sectional view of a preferred form of brush mechanism used in the machine;

Figure 15 is an end elevational view of the brush shown in Figure 14, taken in the direction of arrows 15—15 of Figure 14;

Figure 16 is a fragmentary longitudinal sectional view through one of the bristle sticks where it connects to the end flange of the brush hub, taken at the level of line 16—16 of Figure 15 and in the direction of arrow 16 of Figure 14;

Figure 1:
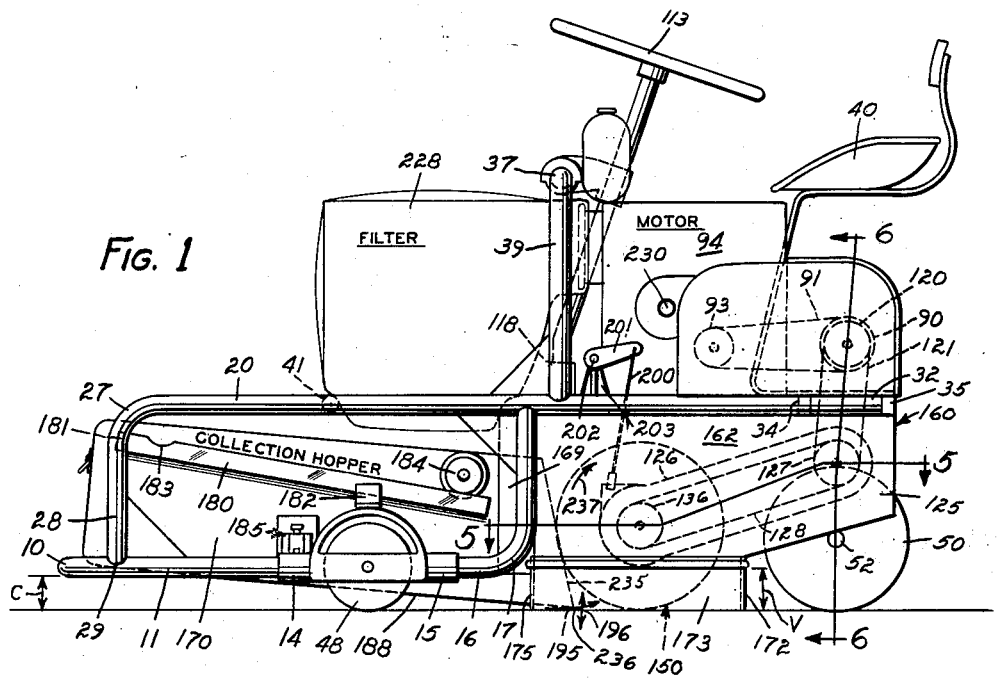

In general the apparatus of the instant invention consists of a self-propelled, mobile and very agile and maneuverable operator carrying frame which is provided with a rotary brush mechanism that is power driven and mounted on the machine in an open bottom enclosure, the enclosure being so constructed that the brush is sealed, or relatively sealed, in respect to the surface which is to be swept. The mobile frame likewise includes a hopper situated in respect to the brush so that material swept as the machine moves is projected by the brush and into the hopper. The mobile frame also includes a suction blower mechanism connected to the brush enclosing housing so as to withdraw air therefrom at a relatively low rate, only sufficient to maintain a slight negative pressure within the housing in which the brush rotates and the brush sweeping action takes place, the exhaust side of the blower being connected to a porous bag for filtering out such dust as may be carried by the slight airflow. It is a feature of the invention that the blower mechanism provides only a slight negative pressure in the brush enclosure and no reliance is made upon the inflow of air thereinto through the relatively imperfect seal between the enclosure and the surface being swept, to pull dirt off the surface being swept, this surface cleaning action being provided practically entirely by the brush. The slight negative pressure within the brush housing serves only to prevent dust, which is raised by the brush, from drifting out of the housing into the general area of operation of the machine. These features of the invention and others are more apparent in the following detailed description.

Referring to the drawings the machine includes a frame, preferably made of welded steel tubing, having a forward bow 10 having side sections 11 and 12 which extend along the front bottom portion of the frame to a pair of front (small) wheel housings, one housing being carried on each of the side frames. Thus, frame 11 is connected with a cast steel front wheel housing 14 and the rear portion of this housing 15 conects again to a further extension 16 of the lower front side frame member, this extension being curved upwardly at 17 and joined to the top side frame member 20. Similarly, on the right side of the machine the lower front side frame member 12 connects with the front portion 21 of the front wheel housing at the right side of the machine, the rear portion 22 being likewise joined to the portion 23 of the side frame member which is curved upwardly at 24 and joined to the right top side frame member 26. The left top side frame member 20 and the right top side frame member 26 are curved downwardly, as at 27 for member 20, whence it extends down at 28 and is joined at 29 to the member 11. Similarly, the member 26 is curved downwardly at 30 and is joined at 31 to the member 12. The members 20 and 26 extend rearwardly along each side of the upper part of the frame and at their rear portions 32 and 33, respectively, they are connected together by transverse frame pieces 34 and 35, which serve to support various components of the machine. About the middle of the side frame members 20 and 26 there is a transverse frame member in the form of a bow having a top part 37 and downwardly extending portion 38 which reaches to the right side frame member 26 and downwardly etxending portion 39 which reaches to the left side frame member 20. Between the bow 37—39 and the cross frame members 34—35 there is a bed plate extending transversely across the machine frame at the level of the frame members 20—26 which serves as a mounting for various portions of the apparatus and as a floor for the operator position 40 of the machine. This floor plate is suitably reinforced and braced by additional cross frame members not shown. Another cross frame member is provided at 41 and extends across between the top side frame members 20 and 26 forwardly of the bow 37—39.

The wheel housings mounted upon the lower front side frame members 11 and 12 are the same except that one is a right and the other is a left; therefore, only one need be described. Referring to Figure 2, the right-hand side of the machine, the front wheel housing has the connection sleeves or bosses 21 and 22 by which it is joined to the frame members 12 and 23, respectively. These tubular bosses 21 and 22 are integral with a bow portion 43 which is tied together at its lower portions adjacent the bosses by inner and outer side plates, of which the outer one 44 is shown. The side plates serve to support an axle at 45 on which a pneumatic or solid rubber tired wheel 48 is mounted for free rotation. The bow 43 serves not only as a stiffening member but as a wheel guard for the protection not only of the machine but of persons nearby.

The rear portion of the machine is supported by a pair of closely spaced wheels 50—51 which are somewhat larger in diameter than the wheels 48 at the front of the machine. The wheels 50—51 are mounted on a cross axle 52 and only one of them, viz. wheel 50, is keyed to and driven by the axle, the other being free to revolve thereon by virtue of the anti-friction bearings at 53. The tires on the wheels 50 and 51 may be either solid or pneumatic and have good traction tread surface. The axle 52 is connected and mounted onto the cross frame members 34—35 by means of a supporting bracket generally designated 54, Figure 4, which has downwardly extending frame pieces 55 and 56 terminating in journal hubs at 57 and 58. The shaft 52 is freely rotatable in anti-friction bearings within these hubs and is held from sideward movement thereon by virtue of the attachment of wheels 50 to the shaft 52 at one side of hub 58, and the attachment of bevel drive gear 59, which is keyed to the shaft 52 at key 60 and additionally fastened by set screw 61. The upper portion of the supporting member 54 is mounted for free rotation upon a tubular shaft 62 which extends upwardly through bearing 63. The upper portion 64 of the frame member 54 is pressed onto the tubular shaft 62 and immediately above it there is pressed-on a segmental gear 65 having a worm wheel portion 66 which cooperates with the worm 67 of the steering mechanism so that as the segmental gear 65 is rotated the entire frame 54 is likewise rotated, and hence the wheels 50—51 are steered whenever the worm wheel 67 is turned. The segmental gear 65 is shaped so as to receive the bottom race 68 of a ball bearing assembly 69, the top race 70 of which is mounted within a retainer 71 carried on the cross frame members 34 and 35. The segmental gear member 65 is keyed at 73 to the tubular shaft member 62. The upper portion of the tubular shaft 62 is free to rotate in the bearing 63 and above the bearing 63 there is a screwed-on clamping collar 74 which serves to hold the entire shaft 62 and member 54 and the wheel which it carries, firmly in the bearing assembly. Into the upper end 75 of the tubular shaft there is provided an anti-friction bearing 76 and at the lower end of the tubular shaft 62 there is provided another anti-friction bearing 77. These serve rotatably to support the vertical inner drive shaft 78 which is provided at its lower end with a bevel gear pinion 80 which is keyed to the shaft at 81 and is provided at its upper end with a considerably larger bevel gear 82 which is keyed onto the shaft by means of key 83.

Upon the frame members 34—35 there are a pair of bearing supporting blocks 79 and 84 which serve to support a main drive shaft 85 which rotates freely in the bearing 86 of the support 84 and 87 of the support 79. There is a third support for this shaft shown at 88, Figure 4, this likewise being provided with an anti-friction bearing at 89. At the outer end of shaft 85, as shown in Figure 4, there is provided a sprocket wheel 90 which is connected by means of the roller chain 91 to the drive sprocket 93 of the geared motor 94, which may be any conventional gasoline engine or other suitable power source. It is preferred to use an air cooled gasoline engine of medium rating as the power source. By means of the power supply 94 the shaft 85 is constantly rotated and serves not only to propel the entire frame but also to propel the rotary brush and also to operate the suction blower which supplies the negative pressure in the brush housing, as hereinafter described.

In this instance, the power supply 94 is an air cooled gasoline engine of medium rating as mentioned heretofore. The operation of the motor and hence the drive sprocket 93 is controlled in the manner well known in the gasoline motor art, viz. by a foot pedal 8 journalled loosely on the same shaft 202 which carries pedal 112, so that pedal 8 can be pushed by the toe or heel for operation thereof. A flexible cable 9 is connected to foot pedal 8 in a conventional manner and is also connected to control valve of the carburetor for motor 94. Thus, the operation of the foot pedal 8 is in the conventional manner, that is, pressing forward on the foot pedal will open the valve of the carburetor of engine 94 and consequently supply more fuel thereto and speed up the revolutions of engine 94 and consequently of sprocket 93. The operation of the foot pedal 8 in controlling the supply of gas to the carburetor of engine 94 and hence the speed of the motor is conventional and well known in the industry and will not be further described since it, per se, forms no part of the invention.

Figure 6:
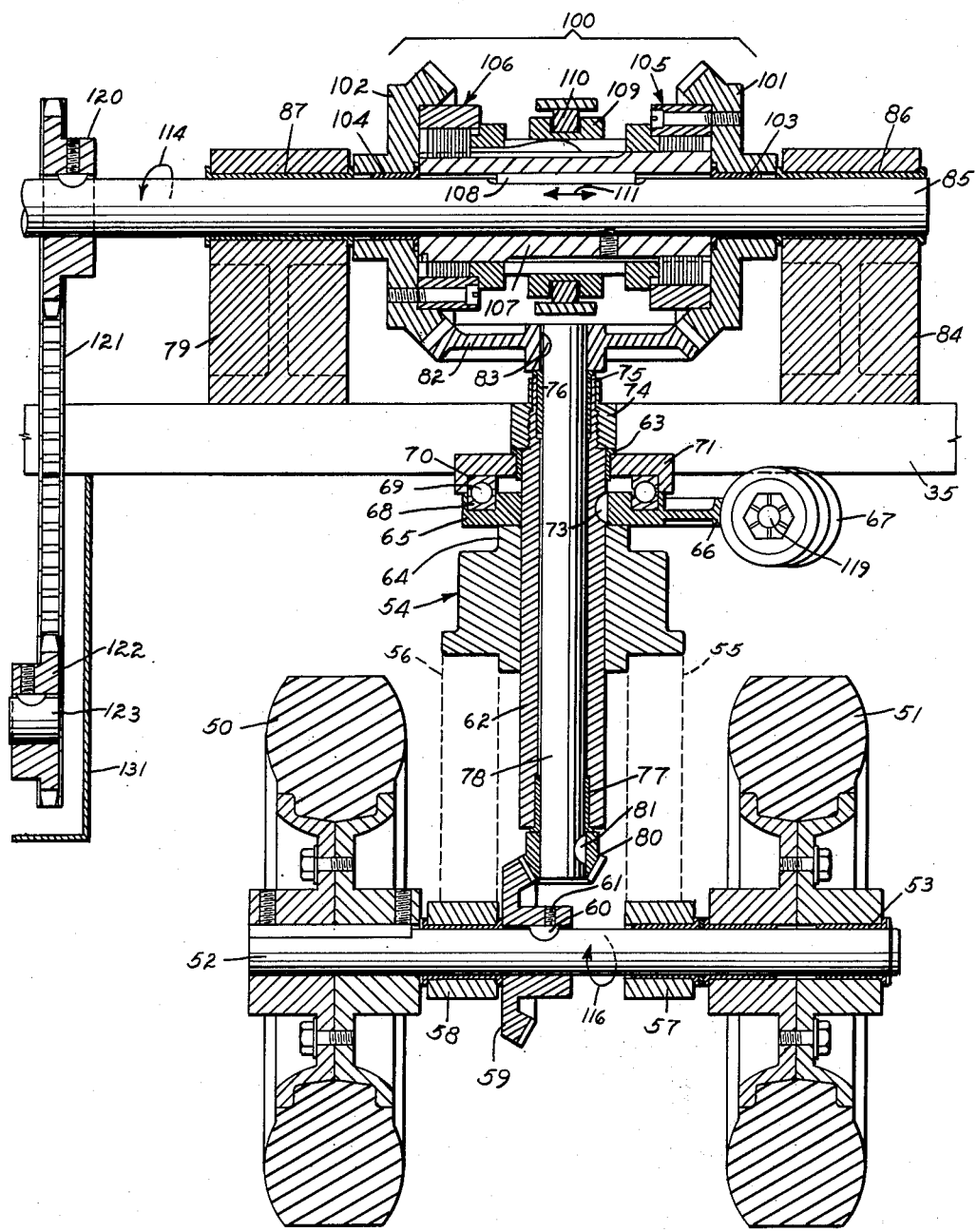
Figure 6 is a greatly enlarged vertical sectional view from the rear of the machine showing the propulsive drive and steering apparatus and taken along the line and in the direction of arrows 6—6 of Figure 1.

The propulsion of the unit in forward and reverse directions is afforded by a forward and reverse clutch and gear driving mechanism shown under the bracket 100 of Figures 4 and 6. This mechanism includes a pair of bevel gears 101 and 102, each of which is mounted for free rotation upon the shaft 85 by virtue of the bearings 103 and 104 and each of which constantly meshes with bevel gear 82. Each of the gears 101—102 is provided with a spline clutch mechanism of a standard type well known in the industry and, per se, forming no part of this invention. The clutches are generally designated 105 for gear 101 and 106 for gear 102, the clutches each having alternate splines keyed to a drive sleeve 107 mounted upon the shaft 85 and keyed to the shaft so as to rotate with it by virtue of the key 108 and alternate splines keyed to the bevel gears 101 or 102. The control of the two clutches is effected by frictionally engaging and disengaging the two sets of plates for clutch 105 or for clutch 106 by means of a common central clutch collar 109 which is movable axially of the shaft by means of the clutch fork 110, which serves to move the clutch collar 109 back and forth, as shown by the arrow 111. The movement of clutch collar 109 is effected by a foot control pedal 112, Figure 3, pivoted for forward and backward rocking motion immediately under the steering wheel 113 adjacent the driver's seat 40, which pedal is connected by the link 96 to crank 95 which pivots around pivot 96a to cause movement of fork 110 axially on sleeve 107. Thus, when the pedal 112 is pivoted at its mid-portion on shaft 202 and when rocked forwardly, as when it is pushed downwardly with the toe, the clutch fork 110 is moved, moving collar 109 to the left in Figure 6, so that the plates for clutch 106 are engaged frictionally and hence the clutch 106 is engaged and the clutch 105 is disengaged. The shaft 85, which is constantly rotating in the direction of arrow 114, Figure 6, causes gear 102 to rotate with the shaft 85 and this causes the gear 82 and shaft 78 to rotate in a clockwise direction, as viewed from the top, which in turn serves to rotate the shaft 52 and the wheel 50 in the direction of arrow 116, viz. the forward direction. Wheel 51 idles on the shaft and contributes to the stability of the machine but not the propulsion. When the pedal 112 is brought to a middle position, the fork 110 disengages clutches 105 and 106, thus holding the machine in neutral, and the machine accordingly stops. When the heel of the operator is pushed down on the pedal 112, the clutch 105 is engaged and clutch 106 is disengaged in the same manner. This causes rotation of gear 101 and hence a rotation of gear 82 and shaft 78 in a direction opposite to that previously described, viz. a direction counterclockwise as viewed from the top, and this causes the machine to move in a reverse direction.

The steering wheel 113 is connected through a universal joint at 118 and bevel gears, not illustrated, and thence through a shaft 119 under the floor plate to the worm gear 67. Hence, as the wheel 113 is rotated the gear 67 is likewise rotated, thus causing the segmental gear portion 66 to be moved arcuately and since it is connected to the frame support 54 the latter and tubular shaft 62 are rotated in the thrust bearing 68—70. This causes the wheels 50 and 51 to be steered permitting a very agile and controllable action of the machine in close quarters.

Figure 5:
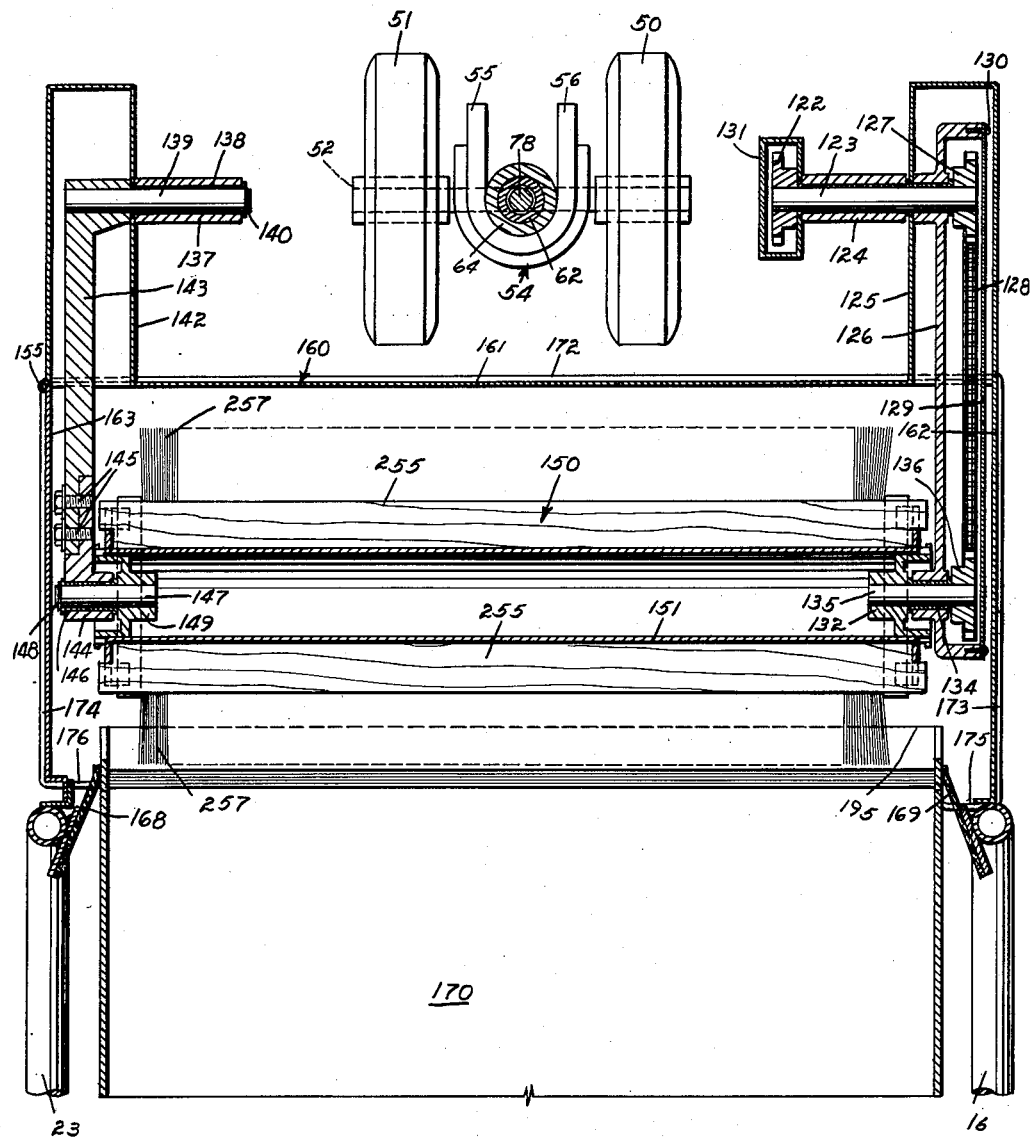
Figure 5 is a slightly enlarged fragmentary horizontal sectional view taken along the line and in the direction of arrows 5—5 of Figure 1.

The shaft 85 previously referred to is also provided with a drive sprocket 120 and as the shaft 85 rotates it serves to drive the chain 121 and through it serves to drive the sprocket 122 and shaft 123, Figures 4–6. The shaft 123 is supported upon a downwardly extending journal pedestal 124 which reaches through the rearward projection 125, Figure 1, of the negative pressure housing of the machine and serves within that housing to support one of the brush supporting radius arms 126, which is in the form of a housing to protect the drive sprocket 127 and the drive chain 128 therein. The housing 126 is closed by a removable cover 129 that is held in place by screws 130. The radius arm housing 126 extends forwardly in the portion 125 of the negative pressure enclosure, Figures 1 and 5, and at its forward end is provided with an anti-friction bearing at 134 upon which the brush drive shaft 135 is rotatably mounted. The brush drive shaft 135 is provided at its inner end with a sprocket 136 over which the chain 128 runs and hence whenever the main drive shaft 85 rotates, power is communicated from it through sprockets 120, chain 121, sprocket 122, shaft 123, sprocket 127, chain 128, sprocket 136 and to shaft 135, which at its inner end has a driven brush supporting hub 132, chain 121 and the sprocket being preferably enclosed by a housing 131.

At the opposite side of the machine there is a similar downwardly extending pedestal 137 which serves, by means of bearing 138, pivotally to support the shaft 139, which is held in place by an end washer and snap ring assembly 140. The left end of shaft 139, as shown in Figure 5, is situated in another rearward extension 142, Figure 2, of the negative pressure housing and the inner end of shaft 139 is connected to a brush carrying radius rod 143 situated within housing part 142 and extends forwardly therein. The forward end of rod 143 is provided with a removable bearing section 144 that is attached to the main arm by means of a pair of cap screws 145. The portion 144, which is thus removable from the portion 143, is provided with an anti-friction bearing 146 in which the stub shaft 147 is freely rotatable, being held therein by means of a washer and snap ring assembly 148. The inner end of the shaft 147 is provided with a press fitted brush supporting hub 149 which is identical in pattern to the driven hub 132.

The two brush supporting hubs 132 (which are rotated from the power source, as previously described), and 149 which idles freely in the bearing 146, serve to support the brush mechanism generally designated 150 within the negative pressure enclosure of the machine and since the hubs are of the same pattern, the entire brush can be reversed for long brush life. The brush mechanism will be described in greater detail hereinafter with reference to Figures 14–17, but it may be stated now that it is keyed to the hub 132 by means of a keying slot or pin which connects the member 132 to the inner cylindrical portion 151 of the brush. The other rotatable hub 147 merely slides into the opposite end of the tubular axle portion 151 of the brush and is held therein by the removable portion 144 of the radius rod. When it is desired to renew or change the brush it is only necessary to remove the cap screws 145, whereupon the portion 143 of the radius rod can be swung out of the way and the portion 144 can then be pulled out of the cylindrical portion 151 of the rotary brush and the entire brush 150 can then be pulled out of the negative pressure housing after the door 163 thereof is swung open.

Figure 11:
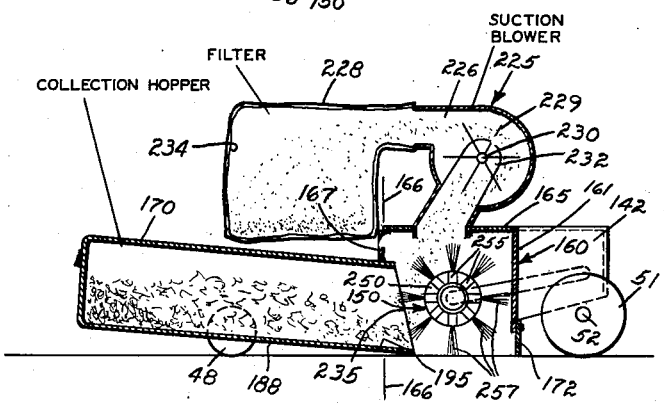
Figure 11 is a longitudinal sectional view of the machine, with certain parts removed and partly schematic in character, showing the air system of the apparatus and brushing arrangements; this view being taken along the line and in the direction of arrows 11—11 of Figure 3.

Referring particularly to Figures 5 and 11 of the drawings, upon the frame there is provided a negative pressure housing generally designated 160 having a rear wall portion 161 and side wall portions 162 and 163. The side wall portion 163 is in the form of a door which is pivoted at 155 and arranged to be held closed by a suitable latch 164, Figure 2. The housing has two rearwardly extending portions 125 and 142, previously mentioned, which enclose the rearwardly extending parts of the brush-carrying radius rods 126 and 143. The portion 125 is shown on the left side elevational view of the machine, Figure 1, and portion 142 is shown on the right side elevational view, Figure 2. These portions need only be large enough to provide free up and down motion of the radially movable brush mounting arms 126 and 143. The negative pressure housing has a top closure 165, Figure 11. The front wall of this housing, at the vertical line 166—166, Figure 11, is provided around its top portion 167 and at each of its side portions 168 and 169 with flexible rubber seals which serve to receive the rearwardly extending top and side portions of the dust and trash collecting hopper 170. The members 167, 168 and 169 can be composed of any flexible, relatively impervious material, such as rubber or felt, and as the rear portion of hopper 170 is moved rearwardly it flexes the seals and moves into the space defined by the flexible top seal 167 and the flexible side seals 168 and 169 and then flexes them far enough back so as to permit the pan to extend into the negative pressure housing 160 to the position shown in the drawings. Freedom of up and down movement of the hopper 170 is provided, to allow clearance of floor obstructions, as hereinafter described.

The lower edges of the rear wall 161 and the side walls 162 and 163 of the negative pressure housing are provided with flexible skirts which reach down to and rub lightly along the floor surface being swept. Thus, referring to Figures 1 and 11, the rear wall sealing skirt 172 is fastened to the rear wall 161 in such a way as to extend downwardly into rubbing contact with the floor. This floor sealing skirt is flexible and may be composed of rubber or felt or the like and extends as a continuous piece from the back wall 161 and thence forwardly around the side walls 162 and 163, as shown at 173 at the lower portion of side wall 162 and 174 at the lower portion of side wall 163. At the forward edge of these side walls the material is turned in as at 175, Figure 1, and 176, Figure 2, so as to engage and meet the flexible dust pan engaging elements 168 and 169 and form with them an effective barrier against the unrestricted entrance of air into the negative pressure enclosure 160.

Figure 7:
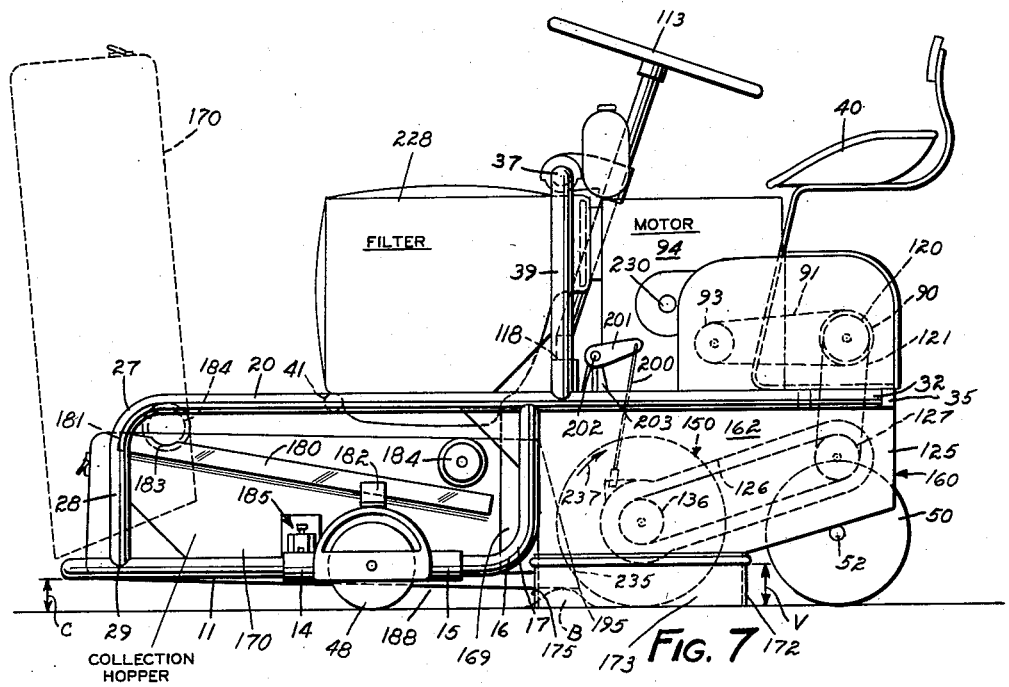
Figure 7 is a left side elevational view of the machine illustrating in full lines the manner in which the hopper of the machine clears obstacles and illustrating in dotted lines the dumping action of the material collecting hopper.

The front portion of the machine is provided at each side with a side rail for supporting the dust and trash collecting hopper 170. Thus, referring to Figures 1 and 2, on the right hand side of the machine (Figure 2) there is provided a side rail 171 which is mounted at its forward end by welding at 177 to the front side frame member 30, and is supported at its rearward portion by means of an angular bracket 178 mounted on the semi-circular guard 43 of the front wheel housing. Similarly, on the left side of the machine, Figure 1, there is provided a rail 180 which is welded at 181 to the front portion 21 of the upper side frame member and is attached at its rear end to the bracket 182 on the left front wheel housing. The rails 171 and 180 are bar stock and each is provided with a circular notch, as at 183, into which the supporting wheels 184 of the hopper 170, are adapted to move and rest temporarily for dumping, as shown in Figure 7. In the operative position, however, the wheels 184, which are rotatably fastened to the sides of the hopper 170, rest on the rearwardly extending portions of the side rails 171 and 180 and thus support the rear end of the hopper 170. At a position slightly ahead of the middle of hopper 170 it is supported by a pair of side brackets generally designated 185, Figures 1 and 2, which are fastened to the sides of the hopper 170. These brackets are shown in greater detail in Figures 8, 9 and 10 and are identical. Hence, only one side need be described.

Referring to Figures 8–10, which show the right front side of the machine, the front boss 21 of the right front wheel housing has an inwardly extending lug 186, Figures 9 and 10. A similar lug extends inwardly from the corresponding boss 14 on the left wheel housing on the left side of the machine, Figures 1 and 7. These lugs 186 are each engaged by one of the brackets 185 on the left and right sides of the hopper 170. The brackets 185 are each provided with a vertical notch portion 190 and a solid upper portion 191 through which extends a vertical screw 192 which is threaded in the portion 191 for upward and downward adjustment. The screw may be held in any adjusted position by means of the lock nut 193. The screw reaches into the notch 190, as shown in Figures 9 and 10, and rests upon the upper surface 194 of the lug 186, and this supporting action accordingly holds the entire bracket 185, and hence the forward mid-portion of the hopper 170 vertically with reference to the supporting lugs. As the adjusting screw 192 is rotated it raises and lowers the middle and front portion of the hopper 170 and rotates it about the axles of wheels 184 that rest on the rails 180—171. This pivoting action also moves the lower rear lip 195 of the hopper 170 in an up and down direction, as shown by the double arrow 196, in Figures 1 and 2, and hence this lower lip 195 can be adjusted for any clearance with reference to the surface being swept, merely by adjusting the screws 192. The fact that the lug members 186 rest within the notch 190 of the brackets 185 also serves to prevent the bracket from moving forwardly or rearwardly with reference to the machine and hence holds the wheels 184 from rolling on the rails 180—171, even though these rails do not have notches where the wheels rest when the hopper 170 is in sweeping position.

When it is desired to dump the collection of dust and dirt accumulated within the hopepr 170, the operator grips the forward handles, of which handle 198 is shown in Figure 8, and merely lifts the hopper sufficiently at its front end so as to move the brackets 185 upwardly out of engagement with the lugs 186 and when this has been done the entire hopper 170 can be drawn forwardly, rotating the wheels 184 along the tracks 180—171 until the wheels fall into the notches 183, as shown in the dotted lines in Figure 7. When in this position the forward end of the hopper can be rotated to a vertical position, thus permitting any dust, dirt or trash accumulated within the hopper to fall freely onto an unloading space on the floor or depressed collection area. In order to return the dust collection hopper 170 from its elevated position, shown in Figure 7, the forward and raised end is lowered and the wheels permitted to run down the inclined rails 171—180 until the lugs 185 can again be engaged upon the lugs 186.

Figures 1 and 2, and particularly Figure 7, also illustrate the manner in which the hopper 170 can raise and clear floor obstacles, such as bump B, which might, for example, be a manhole cover. Normally the front end of hopper 170 is much higher off the floor than the rear end (lip 195) and the bottom of the hopper slants down towards the brush. As the machine goes forward, the bump B, Figure 7, thus clears the front of the hopper but the machine gradually proceeds until the bump B engages the bottom 188 of the hopper. When this occurs, the upward force of the bump raises the hopper, causing wheels 184 to be lifted off rails 171—180, and pivoting the hopper about the tips of adjustment screws 192 where they rest upon lugs 186. This continues until the lip 195 of the hopper rides off the bump, whereupon the hopper resumes normal position. It will be noted that the vertical dimension V of the seals 172, 173 and 174 around the lower edges of the negative pressure housing side and rear walls is greater than the clearance height C beneath the front frame member 10, and that the front end of the hopper bottom 188 is above the lowest surface of frame member 10. Hence, any obstacle which clears frame member 10 will also be passed over without harm to the machine and without anything more than temporarily interrupting the negative pressure seal of the machine to the surface being swept.

The downward slant of the bottom 188 of the hopper 170, from the front of the machine toward the rear of the machine, has the effect of permitting relatively large objects, such as boxes, soda pop bottles, large stones, and the like, to enter under the forward end of the hopper 170 as the machine is progressing in the forward direction. As the machine proceeds the bottom 188 of the hopper 170 comes closer and closer to the object and gradually engages it. In some instances this causes the object to roll along between the bottom 188 and the floor, but the object eventually reaches the lip 195 and passes thereunder and is swept into the hopper. In the case of relatively large objects, such as large stones, soda pop bottles, luncheon cartons, and the like, these usually cause the lip 195 to be elevated temporarily so as to admit their passage into the negative pressure region immediately ahead of the rotary brush 150. In this connection it will be noted that the position of the support 185 at opposite sides of the hopper 170 is such that the hopper is nearly balanced, being only slightly overweighted at the rear end 195. This has the effect of permitting the hopper lip 195 to be elevated with relative ease by objects passing thereunder, so as to facilitate their being swept into the hopper. In the case of pieces of paper and the like there is usually sufficient adherence to the floor so that they are not pushed along ahead of the lip, and the machine has exceedingly good cleaning effect, even on highly polished floors that are littered with paper. The in-rush of air in the slight space under the lip 195 has the effect of accelerating the passage of dirt, dust particles and litter into the negative pressure area and thus greatly facilitates the sweeping operation.

The forward ends of the brush-carrying radius arms 126 and 143, Figure 5, are held vertically by a pair of links or cables. Thus, the arm 126 is held by a cable 200 which extends through a small hole and up to a crank arm 201 on the shaft 202 that is pivotally supported in the bracket 203. Similarly, the arm 143 is supported by the link or cable 205 that extends up through an aperture in the negative pressure housing 160 and is connected to portion 206 of a bell crank 207 that is mounted on the same shaft 202. The shaft 202 and bell crank 206—207 rotate with reference to a quadrant 208, this being shown in Figure 12. The quadrant is provided with an arcuate slot 209 in which an adjustable clamp screw stop 210 may be positioned and adjusted by tightening the screw lever 211 so as to hold the top in any selected position. The portion 207 of the bell crank is drilled out slidably to receive an upwardly extending tubular lever arm 212 terminating in a handle 213. By moving the lever 213 counterclockwise (in Figures 2 and 12) the bell crank 207 is rotated and this causes the shaft 202 likewise to rotate and the cranks 201 and 206 are therefore lowered, and drop the cables 200 and 205, thus vertically positioning the front ends of the brush mounting radial arms 126 and 143 at any desired elevation selected by the operator, and this adjustment can be held by fixing the stop 210—211. In this way the axis of rotation of the rotary brush 150 may be adjusted so as to provide light or heavy contact of the bristles of the brush with the surface being swept, so as to give maximum brush life and brushing efficiency. Thus, by setting the stop 210 at any place upon the arcuate slot 209 the rearward (counterclockwise) rotation of the bell crank 206—207 on the shaft 202, can be stopped so as to provide a lowermost or bottom position to which the brush moves. When it is desired to hold the brush in elevated position, the operator control handle 212 is pushed downwardly as it is pushed forwardly, thus causing cross pin 214 to drop into end notch 215 in the quadrant 208. It will be noted that the tubular portion 207 of the quadrant 208 has side slots 216 in it permitting the up and down movement of cross pin 214. The notch 215 is located at a position on the quadrant such that the brushes are raised, and hence when pin 214 locks into notch 215 it holds the rotary brush in a raised position until the lever is again released. The tubular lever 212 has a solid reinforcing slug 217 where the pin 214 passes through, the pin 214 being a drive fit.

Referring particularly to Figures 2, 3 and 11 the motor 94 is directly connected to a blower mechanism 225 having a scroll outlet housing 226 connected to a porous bag 228. The blower mechanism has an internal fan 229 mounted upon the motor shaft 230 and the blower has an inlet passage 232 into the central area of the fan 229, the inlet passage 232 extending downwardly and being connected to and opening into the upper wall 126 of the negative pressure housing 160 which encloses the brush 150. The porous bag 228 is preferably constructed of a somewhat coarsely woven outer bag portion and an inner more closely woven bag portion 234.

As previously described the negative pressure housing 160 enclosing the brush is closed to the surface over which it sweeps by means of the flexible, downwardly-extending skirt portion 172—173—174 and the forward part of this negative pressure housing is connected so as to be joined in relatively tightly sealed arrangement, with the open rearwardly extending portion 235 of the hopper 170, the lip 195 of the hopper being very close to the surface over which the entire mechanism operates, but spaced slightly therefrom. As the motor 94 rotates the blower mechanism 225 produces a suction on the intake conduit 232 of the blower and this slight suction or negative pressure is communicated to the negative pressure housing 160 around the brush. The negative pressure also extends into the dust collecting hopper 170 which is open to the brush enclosure and also extends down to the floor surface on which the rotary broom 150 operates. The flexible members 172—173—174, closing the lower portion of the negative pressure brush housing to the floor, do not effect a completely air-tight seal and hence there is always a slight amount of air leakage into the enclosure 160 under the lower edge of the flexible members. There is likewise also a slight amount of air entering under the lip 195 of the hopper 170, as shown by the arrow 236, Figures 1 and 2. Since the brush is rotating in the direction of arrow 237, the inwardly flowing air at 236 tends to impinge across the bristles of the brush 257 and thus provides a cleaning action of the bristles, but the amount of air thus entering and the amount of air entering the housing under the flexible skirt 173—174 is so small that there is no "vacuum-cleaning" effect produced by the machine, the inwardly drifting air at such points as it may enter being only sufficient to overcome any tendency of the brush to drive dust laden air out of the enclosure. The very small amount of air actually passing into the negative pressure housing 160 and around the brush serves barely to inflate the bag 228—234 and any slight amount of dust that is carried by the air so moving into the bag is filtered out in the bag and can easily be removed therefrom by disconnecting the bag from the blower outlet 226. The negative pressure developed in the brush enclosure 160 and dust collecting hopper 170 is approximately 0.1 to 1.0 inch of water, and the actual amount of air drawn through the enclosure 160 and over the brush is insufficient to lift any appreciable amount of dirt from the floor surface over which the machine operates. The cleaning action of the machine, which is exceptionally good, is due to the brushing action, there being substantially no vacuum cleaning effect.

Figure 17:
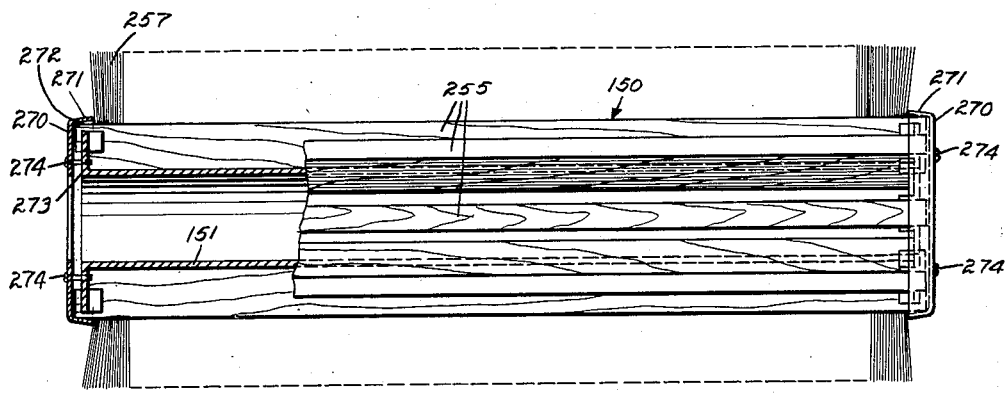
Figure 17 is a side elevational view, partly broken away and in section, showing a modified form of brush mechanism of the invention.

Referring to Figures 14, 15 and 16 the brush element of the instant invention includes a central tube 151 of sheet steel terminating at its outer end in a pair of end plates 250—251 which are provided with notches 252 at spaced intervals therearound. The material punched down from the notches extends inwardly as flanges 253, 254 at each side of each notch. Positioned in each notch there is bristle stick 255 of hardwood or metal which extends outwardly through the notch and is thickened between flanges 250—251 so as to rest against the outer surface of the central tube 151. The sticks 255 are set with bristles 257 along the center line of each stick, in accordance with usual practice. The entire group of bristle sticks 255 are held in place by a hoop 261 at each end of the brush assembly. A middle hoop may also be used. When it is desired to remove the brushes it is only necessary to remove the hoops, after which the bristle-carrying sticks can be lifted off the hubs and removed therefrom. It will be noted that when the sticks are assembled in the end plates, the portion 256 of the stick rest directly upon the inner surface of the tubular cylindrical center member 151. Referring to Figure 17 there is shown a somewhat modified form of clamping arrangement for clamping the bristle sticks. In this form of the invention a clamping pan 270 is provided at each end of the brush assembly, each clamping pan having a frustoconical flange which presents an internally tapered wall 271 at its periphery. The tapered wall 271 has a diameter and is of such a taper as to engage the outer surface 272 of the bristle sticks. The pans 270 are arranged to be drawn towards the end wall portion 273 of the hub assembly by means of a plurality of cap screws 274. As the cap screws are turned down the pans 270 draw in the bristle sticks and the tapered wall portion 271 thus produces an inward driving force on the outer surface of the stick, thus clamping it firmly in place on the rotary hub member.

As many apparently widely different embodiments of this invention may be made without departing from the spirit and scope thereof, it is to be understood that we do not limit ourselves to the specific embodiments herein.

What we claim is:

1. A power sweeping machine comprising a steerable power propelled wheel supported frame, said frame having longitudinal members spaced so as to provide a hopper area therebetween, a removable hopper box having a mouth at one end thereof mounted in said space, spaced tracks on the frame and wheel means on the hopper positioned so as to run on said tracks to support the hopper whereby said hopper may be moved from an operative to an unloading position, and stop means for holding the hopper from moving on the track when the hopper is in operating position, said wheel means being mounted on one end of the hopper to provide rolling support for one end thereof, said hopper having protuberances spaced from said wheels for abutting engaging lugs on the machine frame for providing spaced non-rolling support for another part of the hopper, and said protuberances being freely removable from said engaging lugs.

2. The apparatus of claim 1 further characterized in that the protuberances include vertically adjustable means for varying the vertical position of the hopper relative to the lugs for adjustably tilting the hopper about the axis of said hopper wheels.

3. A power sweeping machine comprising a steerable power-propelled, wheel-supported frame having longitudinal frame members spaced so as to provide an obstruction-free hopper space substantially the width of the frame and throughout a substantial part of the length thereof, a hopper fitted to said space, said hopper having a lower lip, a pair of substantially parallel rails extending along opposite sides of the frame and attached thereto, means for carrying the hopper on the frame including hopper supports attached to the hopper and positioned so as to rest upon the rails to carry the hopper with the lip of the hopper substantially parallel to and closely spaced relative to a floor surface over which the wheel supported frame is propelled, said supports being free to lift from said rails to permit the hopper and the lip thereof to rise and clear obstructions on the floor surface, and a rotary brush mounted on the frame closely adjacent the lip and substantially parallel thereto for sweeping across the lip into the hopper.

4. The apparatus of claim 3 further characterized in that the hopper supports are in the form of wheels which run upon the rails and said means for carrying the hopper also includes rests attached to the hopper and engageable onto a part of the machine frame.

5. The apparatus of claim 3 further characterized in that said rails are slightly inclined downwardly toward the rear of the machine and the hopper is enclosed except for the rear end which is also adjacent the lip, said hopper being dumpable by withdrawing the same forwardly so as to move the hopper supports along said rails and then pivoting the forward end of the hopper upwardly to dump the lip and open end of the hopper downwardly.

6. A power sweeping machine comprising a steerable power-propelled wheel-supported frame having longitudinal frame members along each side of the machine, said members being spaced from each other so as to provide an unobstructed space within said frame members near the forward end of the frame, a cylindrical bristled brush extending transversely of the frame between the ends thereof, said brush being mounted at the rear boundary of said unobstructed space and for rotation with the bristles engageable with the surface over which the machine is propelled, a hopper mounted in said unobstructed space, said hopper having a lip which, during sweeping, is positioned substantially parallel to the floor and closely adjacent the area of contact of the brush with the floor, means for supporting said hopper during sweeping and for movement to dumping position, including a pair of rails mounted on the frame, parallel to each side thereof and extending along said unobstructed space, rail wheels on said hopper near the rear end thereof, said wheels resting on said rails, and a protuberance on the hopper forwardly of the rail wheels, said protuberance resting upon a portion of the machine to support the forward part of the hopper and hold the hopper against movement longitudinally of the frame.

7. The power sweeper of claim 6 further characterized in that said rails are inclined slightly downward from the front to the rear of the machine and said protuberances include vertically adjustable rests for varying the tilt of the hopper and the spacing of the lip from the surface over which the machine is moved.

8. The power sweeper of claim 6 further characterized in that said protuberance on the hopper is in the form of a notch opening downwardly and the portion of the machine with which the protuberance engages is a lug onto which the notch is also engaged.

9. The apparatus of claim 8 further characterized in that an adjustment screw is positioned vertically on said protuberance so as to enter into that part of the notch where the lug enters so the screw engages the lug, thereby permitting vertical adjustment and hence adjustment of the hopper relative to the machine.

References Cited in the file of this patent

UNITED STATES PATENTS

| Number | Name | Date |
|---|---|---|
| 181,735 | Smith | Aug. 29, 1876 |
| 270,834 | O'Neill | Jan. 16, 1883 |
| 460,869 | Hill | Oct. 6, 1891 |
| 514,658 | Marx | Feb. 13, 1894 |
| 599,937 | Jones et al. | Mar. 1, 1898 |
| 656,761 | Adams | Aug. 28, 1900 |
| 772,924 | Clough | Oct. 25, 1904 |
| 913,460 | Bishop | Feb. 23, 1909 |
| 1,097,911 | Brugger | May 26, 1914 |
| 1,107,564 | Ward | Aug. 18, 1914 |
| 1,243,949 | Kelly | Oct. 23, 1917 |
| 1,303,095 | Marston | May 6, 1919 |
| 1,623,236 | De Roo | Apr. 5, 1927 |
| 1,861,681 | Birdsall | June 7, 1932 |
| 1,888,339 | White | Nov. 22, 1932 |
| 1,904,881 | Presbrey | Apr. 18, 1933 |
| 1,996,544 | Justice | Apr. 2, 1935 |
| 1,999,696 | Kitto | Apr. 30, 1935 |
| 2,244,848 | Olds | June 10, 1941 |
| 2,283,229 | Richards | May 19, 1942 |
| 2,286,245 | Wilson et al. | June 16, 1942 |
| 2,300,280 | Teager | Oct. 27, 1942 |
| 2,314,381 | Arnett | Mar. 23, 1943 |
| 2,372,404 | Taylor | Mar. 27, 1945 |
| 2,477,066 | Kuert et al. | July 26, 1949 |
| 2,530,720 | Paulson | Nov. 21, 1950 |

FOREIGN PATENTS

| Number | Country | Date |
|---|---|---|
| 220,165 | Great Britain | Aug. 14, 1924 |
| 453,593 | Great Britain | June 5, 1935 |
| 608,850 | Germany | Feb. 1935 |
| 697,945 | France | Nov. 5, 1930 |